(12) United States Patent
Tsurusaki et al.

(10) Patent No.: US 9,371,078 B2
(45) Date of Patent: Jun. 21, 2016

(54) CALIPER BRAKE DEVICE FOR RAILWAY VEHICLES

(71) Applicant: NIPPON STEEL & SUMITOMO METAL CORPORATION, Tokyo (JP)

(72) Inventors: Akito Tsurusaki, Tokyo (JP); Hironori Yokota, Tokyo (JP); Kenichiro Kamimura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/364,798

(22) PCT Filed: Dec. 6, 2012

(86) PCT No.: PCT/JP2012/081701
§ 371 (c)(1),
(2) Date: Jun. 12, 2014

(87) PCT Pub. No.: WO2013/089018
PCT Pub. Date: Jun. 20, 2013

(65) Prior Publication Data
US 2015/0021126 A1    Jan. 22, 2015

(30) Foreign Application Priority Data
Dec. 14, 2011  (JP) .................................. 2011-273622

(51) Int. Cl.
*F16D 55/08* (2006.01)
*B61H 5/00* (2006.01)
(Continued)

(52) U.S. Cl.
CPC ................ *B61H 5/00* (2013.01); *B60T 13/365* (2013.01); *B61H 15/00* (2013.01); *F16D 55/2245* (2013.01); *F16D 65/14* (2013.01); *F16D 65/18* (2013.01); *F16D 65/46* (2013.01); *F16D 65/56* (2013.01)

(58) Field of Classification Search
CPC ...... B61H 5/00; B61H 15/00; F16D 55/2255; F16D 55/2245; F16D 65/18; F16D 65/46; F16D 65/56; F16D 65/14
USPC ...... 188/72.9, 71.1, 72.6, 79.55, 153 R, 72.1, 188/71.7, 71.8, 196 R, 197
See application file for complete search history.

(56) References Cited

U.S. PATENT DOCUMENTS 2,464,680 A * 3/1949 Gaenssle ................... 188/153 A
3,189,128 A * 6/1965 Herbert ........................... 188/59

(Continued)

FOREIGN PATENT DOCUMENTS

JP    60-47757    3/1985
JP    3-12632     2/1991

(Continued)

*Primary Examiner* — Thomas J Williams
*Assistant Examiner* — Mariano Sy
(74) *Attorney, Agent, or Firm* — Clark & Brody

(57) ABSTRACT

A caliper body is slidably attached to a truck in the axial direction of a wheel. The body has a tip end portion branched off into two parts. One part is close to an outside of one side of the wheel with another part close to an outside of the other side of the wheel. An operating lever is arranged that rotates, via a protruding-retreating motion of a pneumatic actuator rod, one end side via a connecting link around an eccentric axis, which is rotatably supported by one of branched-off parts of the caliper body, as a center. One brake shoe is slidably installed to an anchor pin of the caliper body to freely rotate on a tip side inner surface of a caliper lever installed in an eccentric part. Another brake shoe is installed on a tip side inner surface of the other branched-off part of the caliper body.

5 Claims, 3 Drawing Sheets

(51) Int. Cl.
*B61H 15/00* (2006.01)
*F16D 65/14* (2006.01)
*F16D 65/18* (2006.01)
*F16D 65/46* (2006.01)
*F16D 65/56* (2006.01)
*F16D 55/224* (2006.01)
*B60T 13/36* (2006.01)

(56) References Cited

U.S. PATENT DOCUMENTS

| | | | | |
|---|---|---|---|---|
| 4,019,608 | A | * | 4/1977 | Johnson ........................ 188/59 |
| 4,374,552 | A | * | 2/1983 | Dayen ......................... 188/72.9 |
| 4,473,136 | A | * | 9/1984 | Emilsson et al. .............. 188/59 |
| 4,497,392 | A | * | 2/1985 | Stensson et al. ............... 188/59 |
| 4,592,451 | A | * | 6/1986 | Persson ........................ 188/71.9 |
| 5,813,499 | A | * | 9/1998 | Staltmeir et al. ............... 188/59 |
| 6,722,477 | B1 | * | 4/2004 | Wolfsteiner et al. ......... 188/72.9 |
| 8,763,765 | B2 | * | 7/2014 | Ebner et al. .................. 188/71.8 |
| 8,794,393 | B2 | * | 8/2014 | Argirovski ................... 188/71.8 |
| 8,875,849 | B2 | * | 11/2014 | Suzuki et al. ................ 188/72.4 |
| 2005/0252727 | A1 | * | 11/2005 | England et al. .......... 188/1.11 L |

FOREIGN PATENT DOCUMENTS

| | | |
|---|---|---|
| JP | 10-505038 | 5/1998 |
| JP | 2005-326013 | 11/2005 |
| JP | 2008-281138 | 11/2008 |
| JP | 2009-190614 | 8/2009 |

* cited by examiner (a)

(b)

CALIPER BRAKE DEVICE FOR RAILWAY VEHICLES

TECHNICAL FIELD

The present invention relates to a caliper brake device that applies braking force on both side surfaces of a wheel of a railway vehicle by holding respective disks that rotate integrally with the wheel from outside on both side surfaces of the wheel.

BACKGROUND ART

A pneumatic-hydraulic converter is required when a hydraulic caliper brake device, which uses hydraulic oil as a pressure medium, is to be used in a railway vehicle in which air is used as the pressure medium. Accordingly, the general trend is to use a pneumatic caliper brake device to abolish a hydraulic source.

However, in order to use the pneumatic caliper brake device, which generates less force than the hydraulic caliper brake device, in a railway vehicle, a larger actuator becomes necessary. Accordingly, the entire device becomes bulky, and such a bulky device is difficult to install within a limited space.

In this regard, Patent Reference 1 proposes a device in which a smaller pneumatic actuator can be used by utilizing the principle of leverage.

However, in the pneumatic caliper brake device proposed in Patent Reference 1, the dimension of the caliper body is large in its sliding direction as the actuator is arranged coaxially with a sliding portion of the caliper body and one end of a lever is rotatably supported by an end of a rod of the actuator.

Moreover, in the pneumatic caliper brake device proposed in Patent Reference 1, the above problem may be escalated because as the brake shoe gets worn out, the distance of protrusion of the actuator rod during braking may become longer, which may result in requiring a longer stroke of the rod.

PRIOR ART REFERENCES

Patent References

Patent Reference 1: Japanese Patent Application Laid-open No. 2008-281138

SUMMARY OF THE INVENTION

Problem to be Solved by the Invention

A problem to be solved by the present invention is to overcome the defect of the pneumatic caliper brake device proposed in Patent Reference 1. That is, although the pneumatic caliper brake device can be downsized compared with the conventional pneumatic caliper brake devices, the dimension of the caliper body is still large in its sliding direction.

Means for Solving this Problem

According to one aspect of the present invention, a caliper brake device for railway vehicles includes, in order to further downsize a pneumatic caliper brake device, a caliper body having a base end portion that is attached to a truck so as to be freely slidable in an axial direction of a wheel and a tip end portion that is branched off into two parts so that one part is located close to an outside of one outer peripheral side surface and other part is located close to an outside of other outer peripheral side surface of the wheel, a pneumatic actuator installed to the caliper body, an operating lever with one end side rotating, in accordance with a protruding-retreating motion of a rod of the pneumatic actuator, around an eccentric axis, which is freely rotatably supported by one of the branched-off parts of the caliper body, as a center via a connecting link installed to the rod on a tip thereof, a caliper lever installed turnably and integrally with an eccentric part formed on the eccentric axis, and one brake shoe installed freely rotatably to the caliper lever on a tip side inner surface thereof and freely slidably to an anchor pin installed to the caliper body, and other brake shoe installed on a tip side inner surface of the other branched-off part of the caliper body.

Because the caliper brake device for railway vehicles according to the present invention implements the rotation of the caliper lever for pressing the respective brake shoes onto the disks installed integrally with the wheel on both side surfaces thereof via the eccentric axis, the pneumatic actuator that allows the caliper lever to rotate can be downsized.

Advantageous Effects of the Invention

According to the present invention, the pneumatic actuator that allows the caliper lever to rotate can be downsized, so as to be replaceable with a hydraulic caliper device without a necessity of remodeling the truck, and abolition of a hydraulic source can be inexpensively achieved.

BRIEF DESCRIPTION OF THE DRAWINGS

FIG. 1(a) is a view of the caliper brake device for railway vehicles viewed from a side of a wheel, and FIG. 1(b) is a partial cross-sectional view of the caliper brake device for railway vehicles viewed from above the wheel;

FIG. 2(a) is a longitudinal cross-sectional view, and FIG. 2(b) is a cross-sectional view along a line A-A shown in FIG. 2(a);

EMBODIMENTS OF THE INVENTION

The present invention achieves an object of further downsizing a pneumatic caliper brake device by causing a caliper lever, which presses both brake shoes against both side surfaces of a wheel, to rotate via an eccentric axis.

Embodiment

Figure 1:
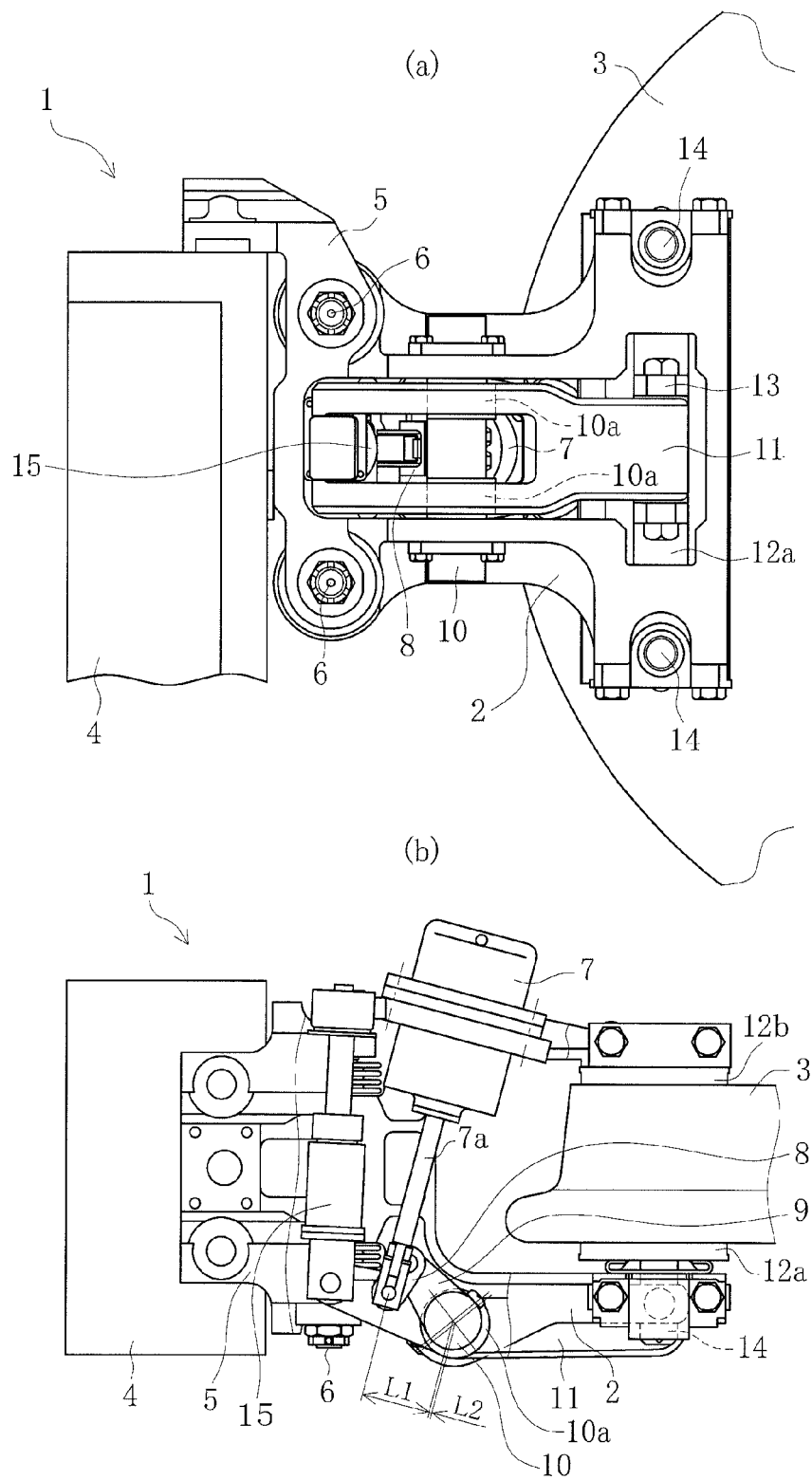
FIGS. 1(a) and 1(b) are drawings explaining a caliper brake device for railway vehicles according to the present invention.

Exemplary embodiments for implementing the present invention are explained in detail below with reference to FIGS. 1 to 3. Reference numeral 1 denotes a floating-type caliper brake device according to the present invention in which a caliper body moves in an axial direction of a wheel by using a pneumatic actuator. The floating-type caliper brake device has the configuration as explained below.

Reference numeral 2 denotes a caliper body having a base end portion that is coupled to a support frame 5 so that the caliper body is freely slidable along two support pins 6 installed on the support frame 5 in an axial direction of a wheel 3, and a tip end portion branched off into two parts in which one part is located close to an outside of one outer peripheral side surface and the other part is located close to an outside of other outer peripheral side surface of the wheel 3. The support frame 5 is attached to a truck 4.

Reference numeral 7 denotes a pneumatic actuator, which is installed to the caliper body 2 at an angle so that a line extending from a rod 7a, for example, intersects with a line extending from the support pin 6. This pneumatic actuator 7 returns to its initial position, when the brake is released, by using a return spring provided inside the actuator.

Reference numeral 8 denotes a connecting link installed to the tip of the rod 7a of the pneumatic actuator 7 so that one end of the connecting link 8 is freely rotatable and the other end thereof is freely rotatably connected to one end of an operating lever 9. Moreover, an eccentric axis 10, which is freely rotatably supported by one of the branched-off parts of the caliper body 2, is integrally installed on the other end of the operating lever 9. In other words, one end of the operating lever 9 is configured so that it rotates around the eccentric axis 10 via the connecting link 8 in accordance with protruding-retreating motion of the rod 7a of the pneumatic actuator 7.

Reference numeral 11 denotes a caliper lever installed integrally to an eccentric part 10a formed on the eccentric axis 10, and one brake shoe 12a is freely rotatably installed to the caliper lever 11 on its tip side inner surface via a brake shoe head 13. This one brake shoe 12a is installed so that it can freely slide also against an anchor pin 14 installed to the caliper body 2. Moreover, the other brake shoe 12b is installed to the other branched-off part of the caliper body 2 on its tip side inner surface.

Reference numeral 15 denotes a clearance adjustment mechanism that adjusts the clearance between the respective brake shoes 12a and 12b and the respective disks installed on the respective side surfaces of the wheel 3.

This clearance adjustment mechanism 15 is installed in such a manner that one end thereof is freely rotatably installed on the base end portion of the caliper body 2 and the other end portion is freely rotatably installed to an end of the caliper lever 11 extending from the eccentric part 10a toward an opposite side of the brake shoe. Moreover, if the clearance between the respective disks has become large because of wear of the brake shoes 12a and 12b occurring due to their use, the distance between installation parts of the clearance adjustment mechanism is increased so as to maintain the clearance constant.

Figure 2:
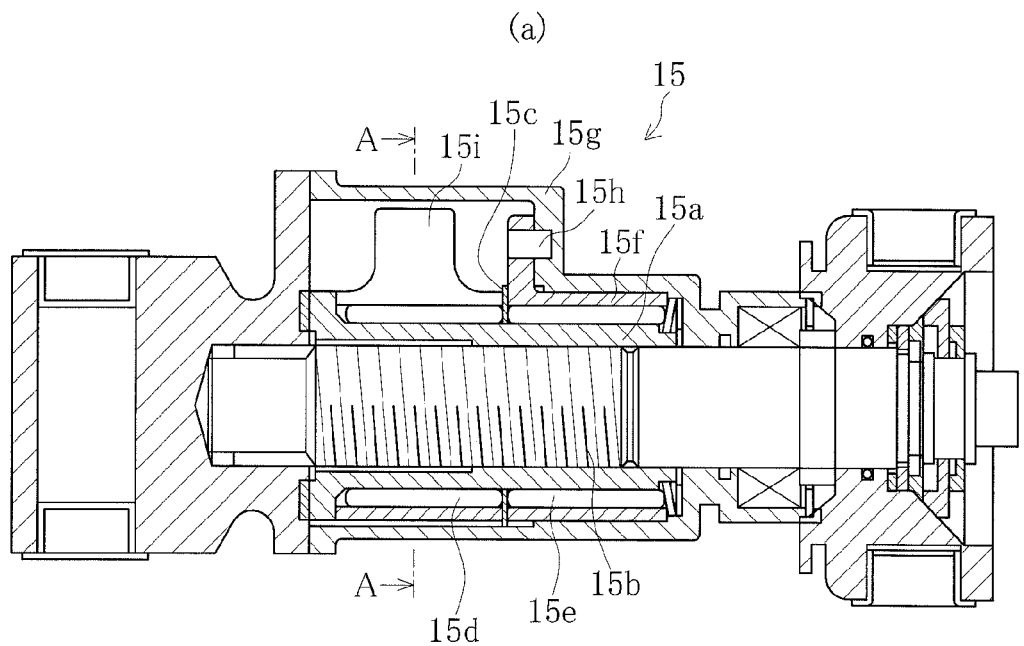
FIGS. 2(a) and 2(b) are drawings explaining an exemplary configuration of a clearance adjustment mechanism installed in the caliper brake device for railway vehicles according to the present invention.
Figure 2:
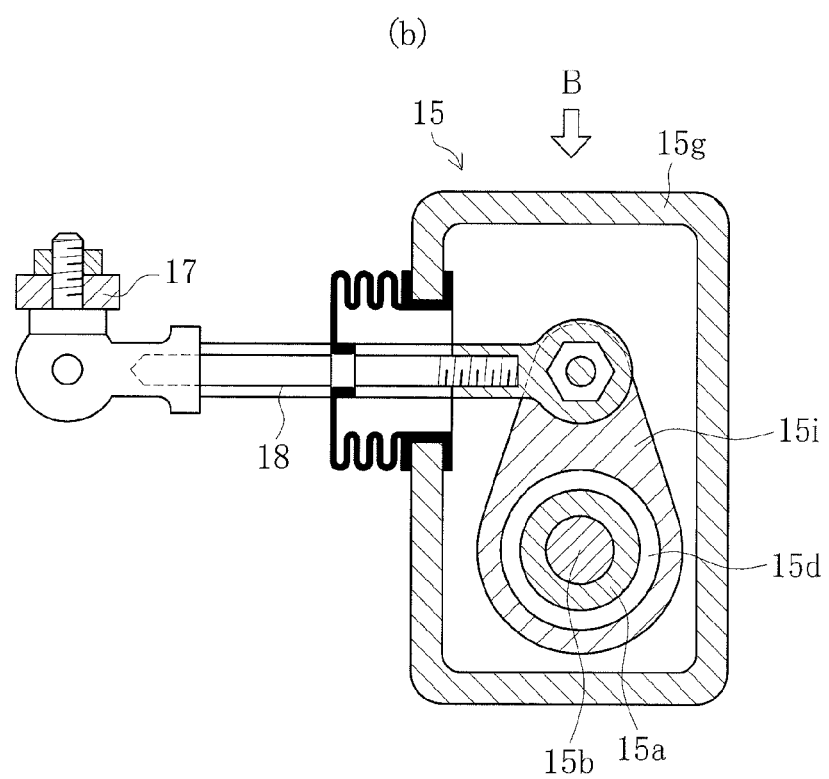
Figure 3:
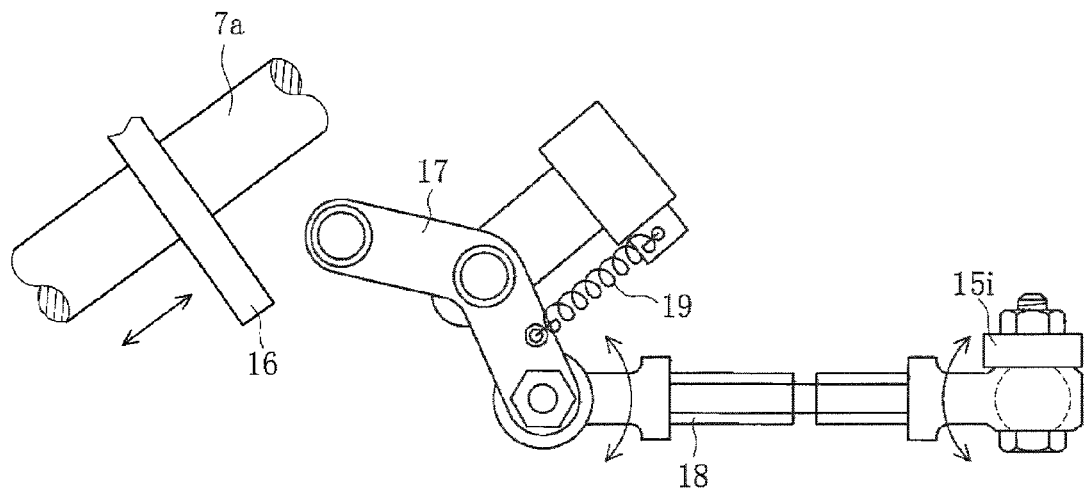
FIG. 3 is a view of main parts of FIG. 2(b) viewed from a direction B shown in FIG. 2(b)

In other words, as shown in FIG. 2, the clearance adjustment mechanism 15 expands and contracts in the axial direction due to relative rotation of a nut member 15a and an axis member 15b, which includes a screw for screwing into the nut member 15a, and the expansion and contraction are implemented by the following configuration.

Reference numerals 15d and 15e denote one-way clutches arranged in series on an outer peripheral side of the nut member 15a via a washer 15c, and the one-way clutch 15d slips when it is rotated counterclockwise, whereas when rotated clockwise, it allows the nut member 15a to rotate clockwise, for example. On the other hand, the one-way clutch 15e slips when it is rotated clockwise, whereas when rotated counterclockwise, it allows the nut member 15a to rotate counterclockwise.

With the above configuration, in the caliper brake device 1 according to the present invention, when the pneumatic actuator 7 is operated and the rod 7a protrudes, one end of the operating lever 9 turns around the other end of the operating lever 9 as a fulcrum via the connecting link 8. In other words, the other end of the operating lever 9 turns.

When the other end of the operating lever 9 turns, the eccentric axis 10, which is integrally installed on the operating lever 9, turns, and thus the caliper lever 11, which is installed to the eccentric part 10a, turns around the axis core of the eccentric axis 10 as a center, and thereby one brake shoe 12a, which is installed to the tip end portion of the caliper lever 11, is pressed against the wheel 3. A reaction force of the motion causes the caliper body 2 to slide in the axial direction of the wheel 3, and as a result, the respective brake shoes 12a and 12b press the wheel 3 from respective side surfaces of the wheel.

When the brake is released, the rod 7a of the pneumatic actuator 7 retreats by the action of the return spring, thus the operating lever 9 is returned to its initial position, thereby the eccentric axis 10 is turned in the direction opposite to that of braking, causing one brake shoe 12a to separate from the wheel 3. Thus, the reaction force of the caliper body 2 is lost and the pressing force applied on the other brake shoe 12b against the wheel 3 is also lost.

In other words, in the present invention, the rotational force as high as L1/L2 of generative force from the pneumatic actuator 7 is transmitted to the caliper lever 11, where L1 denotes a distance from a connecting portion between the tip of the rod 7a and one end of the connecting link 8 to the axis core of the eccentric axis 10, and L2 denotes a distance between the axis of the eccentric axis 10 and the axis core of the eccentric part 10a.

The rotational force causes the caliper lever 11 to rotate toward the wheel 3 around the fulcrum at which an end of the clearance adjustment mechanism 15 is installed and thus one brake shoe 12a is pressed against the disk. This pressing force is equal to a value calculated by multiplying the leverage L1/L2 of the eccentric axis 10 by a leverage of the caliper lever 11 (1 or less in terms of a design layout), and as a result, the pneumatic actuator 7 can be downsized.

Incidentally, if the clearance between the brake shoes 12a and 12b and the disks installed on both side surfaces of the wheel 3 has become large due to wear of the brake shoes 12a and 12b, then the amount of protrusion of the rod 7a of the pneumatic actuator 7 during braking becomes large.

In this case, the clearance between the respective brake shoes 12a and 12b and the respective disks is adjusted in the following manner by employing a configuration such that a pressing member 16 installed to the rod 7a presses a bell crank 17 on one end thereof when the amount of protrusion of the rod 7a of the pneumatic actuator 7 has exceeded a specific stroke.

That is, after being pressed by the pressing member 16 on one end, the bell crank 17 pulls an adjuster operating lever 18 by the rotation of the other end of the bell crank around a central bent portion as a fulcrum and rotates the one-way clutch 15d counterclockwise via a clutch housing 15i. The one-way clutch 15d slips when it is rotated counterclockwise, and although the nut member 15a is affected by corotation force during the slipping, the nut member 15a does not rotate because the clutch 15e is rotated in a locking direction. Note that a cover 15f, which engages the one-way clutch 15e around its outer periphery, is fixed to a casing 15g with a pin 15h and thus does not rotate.

On the other hand, when the brake is released, the other end of the bell crank 17 is caused by a return spring 19 to rotate around the central bent portion as the fulcrum in a direction of pressing the adjuster operating lever 18. The rotation of the bell crank 17 presses the adjuster operating lever 18, rotates the one-way clutch 15d clockwise, and thus applies the torque to the nut member 15a.

In this motion, the nut member 15a rotates clockwise as the one-way clutch 15e slips, and the axis member 15b, which screws into the nut member 15a screws so as to protrude from the nut member 15a, presses the caliper lever 11 outward, and expands the distance between the installation parts of the clearance adjustment mechanism 15. Thus, a constant clearance is maintained between the respective brake shoes 12a and 12b and the respective disks.

When such a clearance adjustment mechanism 15 is installed, further downsizing can be achieved because the amount of protrusion of the rod 7a of the pneumatic actuator 7 need not be increased during braking even if the brake shoes 12a and 12b have worn out.

It is desirable to provide the clearance adjustment mechanism 15 with a function for manually expanding and contracting the mechanism during maintenance for exchanging the brake shoes 12a and 12b and the like. An example of the function for expanding and contracting the mechanism will be explained below with reference to FIG. 4.

Figure 4:
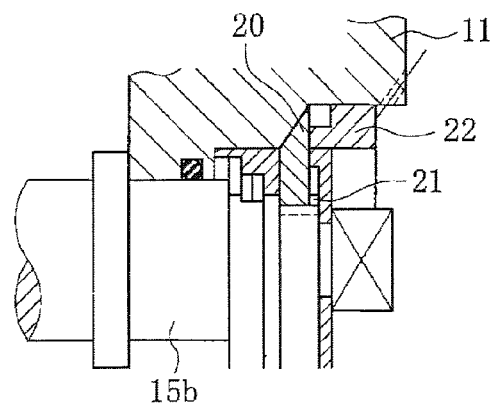
FIG. 4 is a side view illustrating a state of a clearance adjustment mechanism, which is installed in the caliper brake device for railway vehicles according to the present invention, when it is manually set.

FIG. 4 is an enlarged view illustrating one end (the end illustrated in FIG. 2(a) on the right side of the drawing) of the clearance adjustment mechanism 15. Reference numeral 20 denotes a clutch plate coupled with the axis member 15b on its inner peripheral side via a key 21 so as to be movable in an axial direction of the axis member 15b. The clutch plate 20 acts as a clutch when its outer peripheral side comes into surface contact with the end extended from the caliper lever 11, and the clutch plate 20 is allowed to act as a clutch by locking and unlocking a locknut 22, which screws into the extended end.

The surface that acts as the clutch is shown in FIG. 4 as a flat surface inclined in relation to the axial direction of the axis member 15b; however, this surface can be a flat surface perpendicular to the axial direction of the axis member or a corrugated surface. Moreover, with respect to the installation location of the key 21 and the surface acting as the clutch, the key 21 may be arranged on the outer peripheral side and the surface on the inner peripheral side may be used as the surface acting as the clutch contrary to the example illustrated in FIG. 4.

When such a manual expansion and contraction function is provided, the clutch plate 20 is pressed to the extended end of the caliper lever 11 by the locknut 22 during braking in which the expansion or contraction is not manually performed, and thus rotation of the axis member 15b is prevented.

On the other hand, when the clearance adjustment mechanism 15 is to be manually expanded or contracted, the clearance adjustment mechanism 15 can be manually expanded or contracted by the rotation of the axis member 15b by separating the clutch plate 20 from the extended end of the caliper lever 11 by unlocking the locknut 22 to allow the axis member 15b to freely rotate. After the expansion or contraction is performed, the locknut 22 is locked and the clutch plate 20 is pressed to the extended end of the caliper lever 11 to prevent rotation of the axis member 15b.

The present invention is not limited to the above embodiments. The embodiments can be appropriately modified within the scope of technical ideas as defined by the appended claims.

Figure 5:
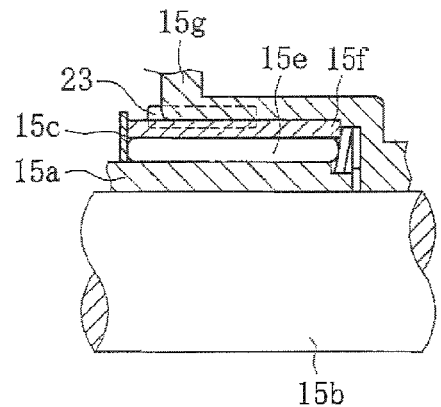
FIG. 5 is a view illustrating another configuration of a rotation stopper for a one-way clutch of the clearance adjustment mechanism, which is installed in the caliper brake device for railway vehicles according to the present invention.

For example, the clearance adjustment mechanism 15 is installed in the above embodiments; however, the clearance adjustment mechanism 15 can be omitted. Moreover, the pin 15h is used to stop rotation of the one-way clutch 15e constituting the clearance adjustment mechanism 15; however, the rotation of the one-way clutch 15e can be stopped by a key 23 as illustrated in FIG. 5.

DESCRIPTION OF REFERENCE NUMERALS

1 Caliper brake device
2 Caliper body
3 Wheel
4 Truck
7 Pneumatic actuator
7a Rod
8 Connecting link
9 Operating lever
10 Eccentric axis
10a Eccentric part
11 Caliper lever
12a One brake shoe
12b Other brake shoe
14 Anchor pin
15 Clearance adjustment mechanism
15d, 15e One-way clutch

The invention claimed is:

1. A caliper brake device for railway vehicles comprising:
a caliper body having a base end portion that is attached to a truck so as to be freely slidable in an axial direction of a wheel and a tip end portion that is branched off into two parts so that one part is located close to an outside of one outer peripheral side surface and the other part is located close to an outside of other outer peripheral side surface of the wheel;
a pneumatic actuator installed to the caliper body;
an operating lever with one end side rotating, in accordance with a protruding-retreating motion of a rod of the pneumatic actuator, around an eccentric axis, which is freely rotatably supported by one of the branched-off parts of the caliper body, as a center via a connecting link installed to the rod on a tip thereof;
a caliper lever installed turnably and integrally with an eccentric part formed on the eccentric axis;
one brake shoe installed freely rotatably to the caliper lever on a tip side inner surface thereof and freely slidably to an anchor pin installed to the caliper body, and other brake shoe installed on a tip side inner surface of the other branched-off part of the caliper body,
wherein the caliper lever is extended from the eccentric part to an opposite side of the brake shoe; and
a clearance adjustment mechanism is arranged between an extended end of the caliper lever and the caliper body and is configured to adjust a clearance between respective brake shoes and respective disks installed on side surfaces of the wheel, wherein
the clearance adjustment mechanism includes two one-way clutches arranged in series and a screw axis member, the two one-way clutches permitting rotation in one direction only and in respectively opposite directions, whereby,
when the amount of protrusion of the rod has become equal to or larger than a predetermined amount, only one of the one-way clutches is rotated by the action of the rod while a position of the screw axis member is maintained by an action of other of the one-way clutches, and when the rod retreats, the other of the one-way clutches rotates while the screw axis member is rotated by an action of the one of the one-way clutches thereby expanding the clearance between the extended end of the caliper lever and the caliper body causing a reduction in the clearance between the respective brake shoes and the respective disks.

2. The caliper brake device for railway vehicles according to claim 1, wherein an expansion/contraction mechanism is added to the clearance adjustment mechanism, the expansion/contraction mechanism comprising a clutch plate having an outer peripheral side coming into surface contact with an extended end of the caliper lever and a locknut that screws into the extended end, the clutch plate acting as a clutch by manually locking and unlocking the locknut.

3. A caliper brake device for railway vehicles comprising:
a caliper body having a base end portion that is attached to a truck so as to be freely slidable in an axial direction of a wheel and a tip end portion that is branched off into two parts so that one part is located close to an outside of one outer peripheral side surface and the other part is located close to an outside of other outer peripheral side surface of the wheel;
a pneumatic actuator installed to the caliper body;
an operating lever with one end side rotating, in accordance with a protruding-retreating motion of a rod of the pneumatic actuator, around an eccentric axis, which is freely rotatably supported by one of the branched-off parts of the caliper body, as a center via a connecting link installed to the rod on a tip thereof;
a caliper lever installed turnably and integrally with an eccentric part formed on the eccentric axis; and
one brake shoe installed freely rotatably to the caliper lever on a tip side inner surface thereof and freely slidably to an anchor pin installed to the caliper body, and other brake shoe installed on a tip side inner surface of the other branched-off part of the caliper body, wherein the caliper lever is extended from the eccentric part to an opposite side of the brake shoe; and
a clearance adjustment mechanism arranged between an extended end of the caliper lever and the caliper body and configured to adjust a clearance between respective brake shoes and respective disks installed on side surfaces of the wheel, wherein
an expansion/contraction mechanism is added to the clearance adjustment mechanism, the expansion/contraction mechanism comprising a clutch plate having an outer peripheral side coming into surface contact with an extended end of the caliper lever and a locknut that screws into the extended end, the clutch plate acting as a clutch by manually locking and unlocking the locknut.

4. The caliper brake device for railway vehicles according to claim 3, wherein when an amount of protrusion of the rod of the actuator has become equal to or larger than a predetermined amount, the clearance adjustment mechanism reduces the clearance between the respective brake shoes and the respective disks.

5. The caliper brake device for railway vehicles according to claim 4, wherein the configuration in which the clearance between the respective brake shoes and the respective disks is reduced when the amount of protrusion of the rod of the actuator has become equal to or larger than a predetermined amount is a configuration that includes two one-way clutches arranged in series and a screw axis member, the two one-way clutches permitting rotation in one direction only and in respectively opposite directions, whereby, when the amount of protrusion of the rod has become equal to or larger than a predetermined amount, only one of the one-way clutches is rotated by the action of the rod while a position of the screw axis member is maintained by an action of other of the one-way clutches, and when the rod retreats, the other of the one-way clutches rotates while the screw axis member is rotated by an action of the one of the one-way clutches thereby expanding the clearance between the extended end of the caliper lever and the caliper body causing a reduction in the clearance between the respective brake shoes and the respective disks.

* * * * *